Nov. 13, 1951     H. PHILLIPS     2,574,886
FLUORESCENT LIGHTING FIXTURE HAVING MEANS TO
CENTER AND ALIGN THE FIXTURE ON A SUPPORT
Filed Nov. 8, 1949     6 Sheets-Sheet 3

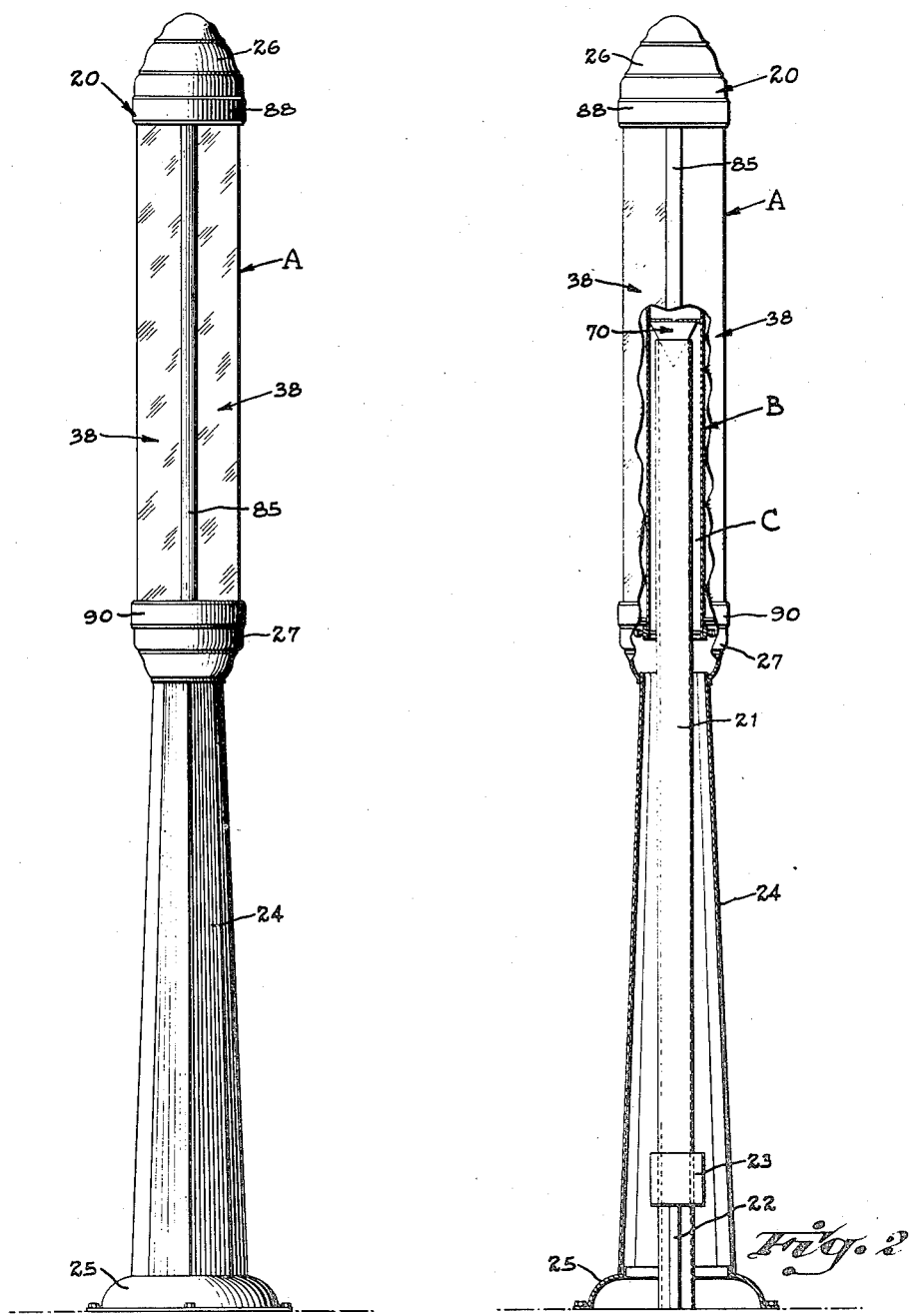

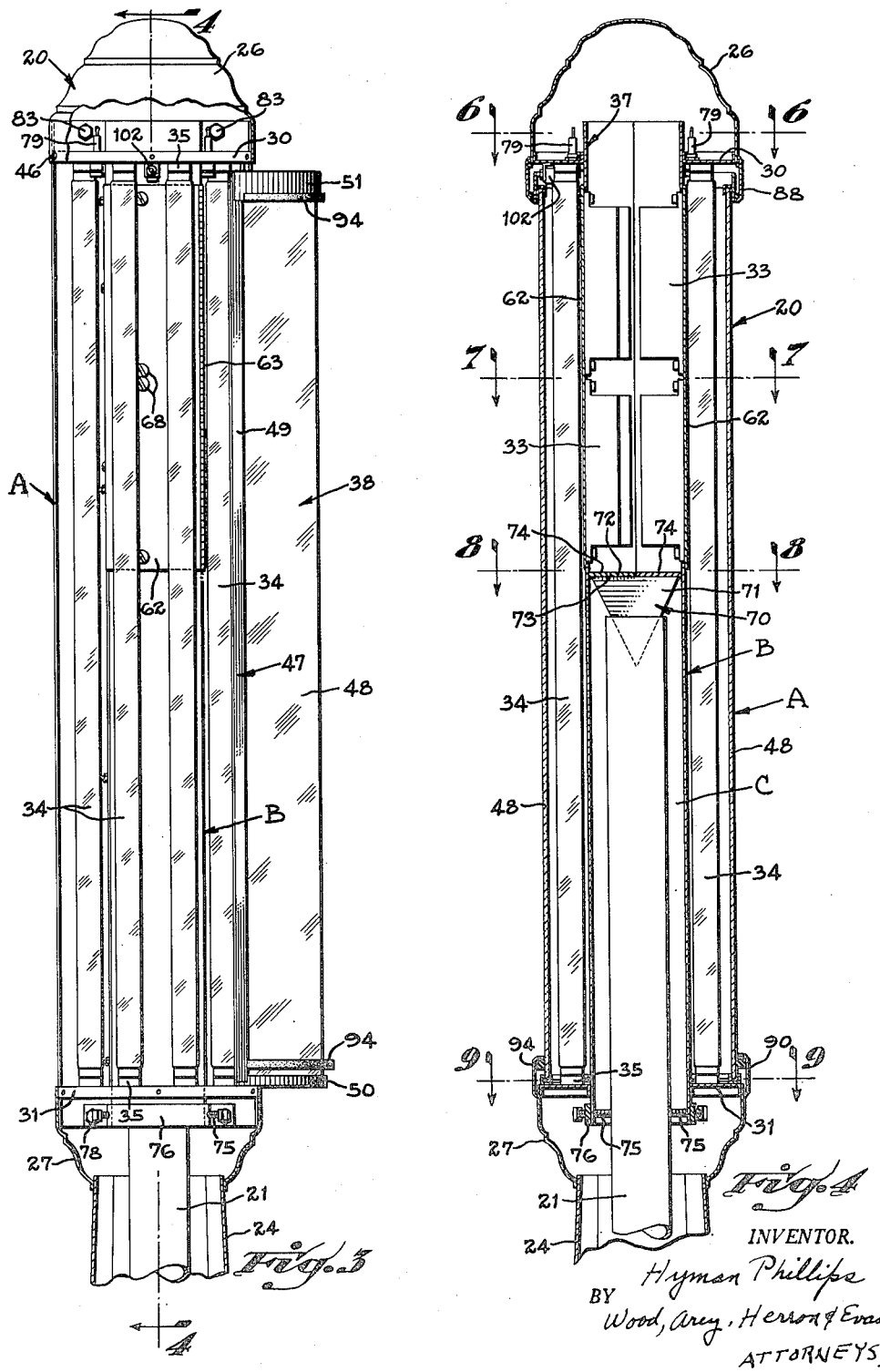

INVENTOR.
Hyman Phillips
BY
Wood, Arey, Herron & Evans
ATTORNEYS

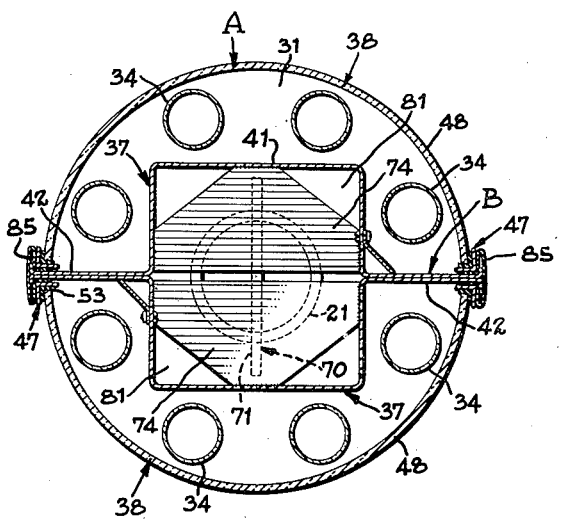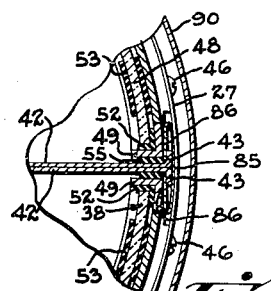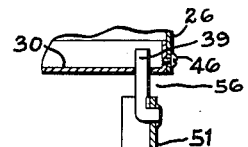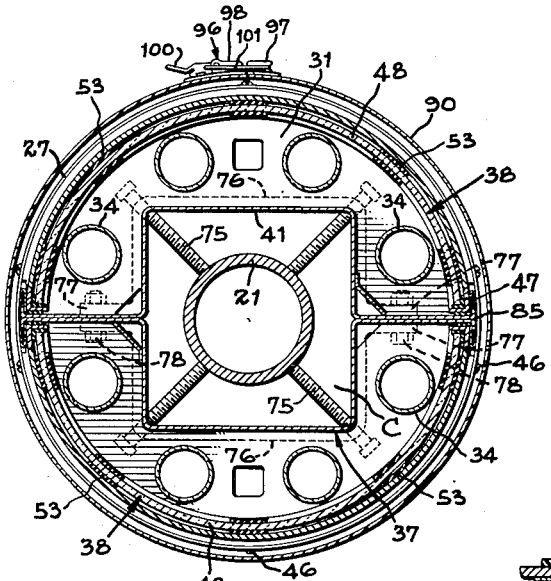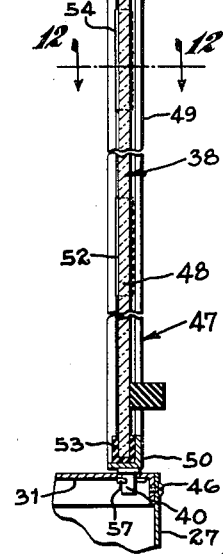

Nov. 13, 1951  H. PHILLIPS  2,574,886
FLUORESCENT LIGHTING FIXTURE HAVING MEANS TO
CENTER AND ALIGN THE FIXTURE ON A SUPPORT
Filed Nov. 8, 1949  6 Sheets-Sheet 5

INVENTOR.
Hyman Phillips
BY
Wood, Arey, Herron & Evans
ATTORNEYS.

Nov. 13, 1951   H. PHILLIPS   2,574,886
FLUORESCENT LIGHTING FIXTURE HAVING MEANS TO
CENTER AND ALIGN THE FIXTURE ON A SUPPORT
Filed Nov. 8, 1949   6 Sheets-Sheet 6

INVENTOR.
Hyman Phillips
BY
Wood, Arey, Herron & Evans
ATTORNEYS

Patented Nov. 13, 1951

2,574,886

UNITED STATES PATENT OFFICE 2,574,886

FLUORESCENT LIGHTING FIXTURE HAVING MEANS TO CENTER AND ALIGN THE FIXTURE ON A SUPPORT

Hyman Phillips, Cincinnati, Ohio, assignor to Oscar Phillips Company, Cincinnati, Ohio, a corporation of Ohio Application November 8, 1949, Serial No. 126,147

4 Claims. (Cl. 240—25)

This invention relates to outdoor fluorescent lighting fixtures for illuminating safely and attractively the exterior of buildings and the surrounding areas of gas stations, garages, and other business establishments serving the public after dark. It has been found that fluorescent tubes create brilliant and attractive outside illumination at relatively low current consumption and in connection with a service station, for example, they provide sufficient light intensity to permit most of the work to be done without the aid of a flashlight. This type of lighting thus is desirable not only in the interest of safety and efficiency, but in addition, it naturally attracts attention at night and, therefore, has a distinct advertising value.

In order to illuminate most efficiently and attractively a given location such as a service station, fixtures are installed at various places about the buildings and surrounding area; for example, they may be mounted upon the buildings themselves and upon pump islands and driveway entrances. The fixtures which are placed upon the buildings are fastened directly to the wall surfaces while those in the surrounding area are mounted upon posts which support them at a proper elevation for efficient light distribution. In order to provide for either installation, the fixture is assembled from interchangeable complementary sections of half cylindrical shape so that the sections can be mounted individually to form wall type fixtures and they may be placed face to face to form a cylindrical column shaped fixture adapted to be mounted upon a post. One of the primary objects of the invention has been to provide a fixture support adapted to engage the top of the mounting post, cooperating with means below the fixture support adapted to adjust the fixture angularly on its mounting post so as to simplify the installation and enable a purchaser to assemble and mount the fixtures and make the necessary electrical connections in a convenient manner without special skill or equipment.

Each interchangeable fixture section is a self-contained unit electrically complete and ready for installation either individually upon a wall as a half column or in mating pairs upon a pole to provide a full column. Essentially, each fixture section consists of an elongated base plate or shank for mounting the fluorescent tubes and electrical parts, with a translucent door in the form of a half cylindrical shell or housing, weather tight with respect to the plate and enveloping its parts. The base plate includes a central longitudinal channel also having a hinged door and the transformers and other electrical parts are mounted upon the door and extend within the channel. A cluster of fluorescent tubes is mounted upon the exterior surface of the base plate in parallelism therewith and with their centers placed in a radius concentric to the radius of the translucent shell.

If the sections are assembled to form a pole mounted fixture, suitable closure caps of cylindrical shape are applied to the upper and lower ends of the assembled unit and, in case the section is mounted individually upon a wall, similar end closure caps which are semi-cylindrical, are applied. When two base plates are placed face to face to make up a cylindrical fixture, the channel of each section combines with the channel of the mating section to provide a tunnel or recess extending centrally through the fixture and having an open lower end; also within the recess at a level spaced above its lower extent, there is located the above noted fixture support, consisting of a relatively flat downwardly tapering stud which centralizes and supports the assembled fixture upon the end of its tubular mounting post. At the lower open end of the recess there is provided a series of radially disposed adjustment screws which are engageable with the post and which are adjusted to align the lamp vertically on the post and clamp it firmly in adjusted position. Thus, the tunnel serves both as a housing for the transformers and as a recess or socket enclosing a portion of the top of the post for centering the fixture upon its post.

This arrangement facilitates the installation of the fixture and renders it substantially self-aligning with respect to the post upon which it is mounted. The preferred procedure is to place the section which contains the centering fixture in position upon the top of the post, place the second section in mating facial engagement with the first and bolt it, and then to adjust and tighten the adjustment screws to complete the installation. Prior to applying the second section of the fixture, the electrical supply lines which pass through the mounting post are passed upwardly through the tunnel for connection to the terminals which are located at the top of the fixture. After having been clamped in position upon the post, the respective closure caps are applied to complete the assembly.

The translucent doors are hinged to the base plates and longitudinal gaskets are interposed between edges of the doors and base plates for weather protection; also, the upper and lower edges of the doors are protected by flexible bands which encircle the fixture at the juncture between the ends of the doors and caps. These bands are clamped in position to compress the door gaskets and to hold the doors firmly in closed position and include gaskets to establish a weather seal between the caps and doors. When it is desired to gain access into the interior of the fixture, the bands are unclamped to permit the doors to be swung to an open position. If it is necessary to service or replace the transformers which are mounted upon the inside of the tunnel doors, the tubes in front of these doors are removed and the tunnel doors can then be swung open, exposing to view the parts which normally reside within the tunnel. This cap and band arrangement is substantially the same for the wall mounted fixture except that the sealing bands are semi-circular to accommodate the half column arrangement.

In order to prevent electrical shocks and to afford protection against the ignition of gasoline fumes by electrical sparking when the fixture is serviced, the fixture doors are equipped with safety switches which deenergize the entire circuit when the door is opened. The switches are provided with highly sensitive actuating stems which are contacted by the door when it is closed to complete the circuit but which open the circuit as soon as the door clamping pressure is removed. Further advantages of the invention will be more fully disclosed in the specification taken in conjunction with the accompanying drawings.

In the drawings:

Figure 1 is a general side elevation of a post mounted lighting fixture.

Figure 2 is a view similar to Figure 1 with parts broken away to illustrate the general arrangement of the structure.

Figure 3 is an enlarged fragmentary view of the fixture with the sealing bands removed and with one of the doors in open position.

Figure 4 is a sectional view taken on line 4—4, Figure 3, with the doors in closed position and the sealing bands clamped in position.

Figure 8 is a cross sectional view taken on line 8—8, Figure 4, detailing the device by which the fixture is supported upon and centered with respect to its mounting post.

Figure 9 is a sectional view taken on line 9—9, Figure 4, illustrating particularly the clamping screws at the lower end of the fixture which, in conjunction with the centering device shown in Figure 8, align the fixture vertically with respect to its post.

Figure 10 is a fragmentary sectional view taken from Figure 9 detailing at an enlarged scale the sealing gaskets for the longitudinal edges of the doors and the trim strip which is applied over the line of juncture between the two sections.

Figure 11 is an enlarged sectional view taken on line 11—11, Figure 6, further detailing the door structure and the hinge arrangement by which the doors are pivotally mounted.

Figure 12 is an enlarged cross sectional view taken on line 12—12, Figure 11, further detailing the longitudinal door sealing gaskets and cushion blocks which are interposed between the glass insert and door frame.

Figure 5:
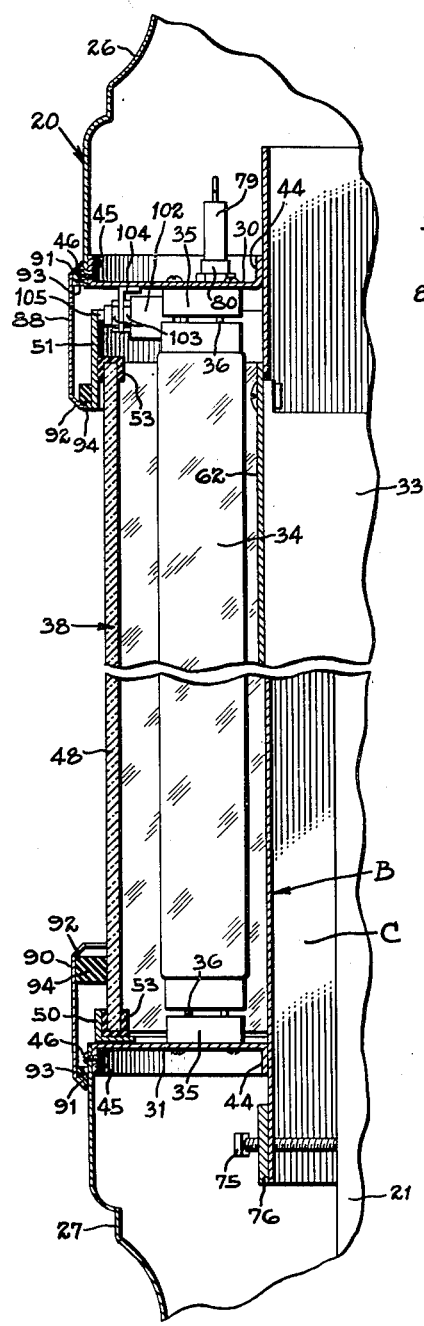
Figure 5 is a fragmentary view of the left-hand portion of Figure 4, illustrating at an enlarged scale certain structural details at the upper and lower ends of the fixture.

The fixtures are supplied to the user in the form of sections, as above noted, for compactness in shipping and for convenient installation. Each section is complete and ready for installation, either upon a flat surface as a wall fixture or, alternatively, the sections may be bolted together to form cylindrical units to be mounted upon posts. By this arrangement, the installation, particularly of the post mounted fixture, is greatly simplified and can be accomplished by the purchaser at very little cost; also, manufacturing costs are reduced since the sections for either installation are substantially identical.

*Post type fixture*

As illustrated in Figures 1 and 2, the fixture indicated generally at 20, is mounted upon a tubular post 21 which is installed permanently, such posts usually being set in concrete to support the fixture at an elevation above the ground; also, in some cases, the posts are installed upon the top of a building. By virtue of an improved centering fixture forming a part of the unit, the fixture is adaptable to posts having various inside diameters, consequently, any existing posts on the premises may be utilized. The wiring for the fixture passes from the usual underground conduit, indicated at 22, and extends from the terminal box 23 into the post 21 and upwardly through the post into the fixture. As shown, the post may be enclosed by an ornamental sheet metal pedestal 24 which rests upon a base 25 secured by bolts to the concrete apron upon which the unit is installed. The pedestal and base are not essential to the present invention and may be omitted, if desired. The fixture 20 is generally cylindrical in shape and is provided with a sheet metal bonnet or cap 26 at its upper end and a bottom cap 27 at its lower end.

Figure 7:
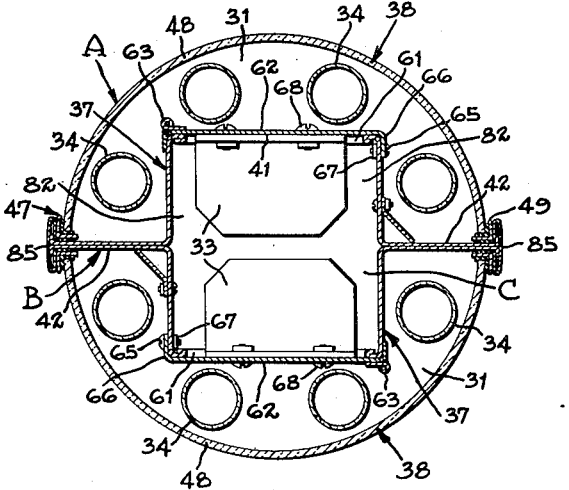
Figure 7 is a cross section taken on line 7—7, Figure 4, illustrating the intermediate construction of the fixture, particularly the arrangement of doors which support the transformers inside the tunnel.

Described in general with reference to Figures 3 and 4, the fixture 20 consists of an outside translucent shell A formed preferably of ribbed glass, an internal sheet metal base or body member B including end closure plates 30 and 31 at its opposite ends. The sheet metal body includes a vertical tunnel C which serves as a receptacle for the transformers 33 and other electrical parts at its upper end, and which receives the mounting post 21 telescopically at its lower portion to support the fixture. The cylindrical shell or cover A is formed from a pair of doors and the sheet metal body is formed from a pair of duplicate half sections which are bolted together, as hereinafter described. As shown in Figures 5 and 7, the fluorescent tubes 34 are mounted at equidistant spacing around the body B within the glass shell A, with their opposite ends secured to the upper and lower plates 30 and 31. The tubes 34 are mounted between sockets 35—35, which are secured respectively to the upper and lower closure plates. The tubes are provided with prongs 36 (Figure 5) which extend into a slot formed in the socket to provide the electrical circuit, the tubes being inserted by slipping them laterally into the sockets with the prongs engaged in the slots. The tubes and their mounting sockets are commercial products of well known construction and therefore need not be described in detail.

Figure 6:
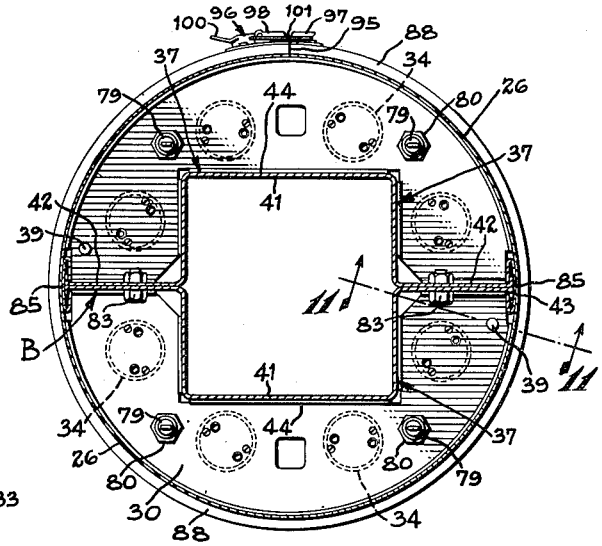
Figure 6 is a cross sectional view taken on line 6—6, Figure 4, illustrating the construction at the upper end of the fixture.

Each half section consists of a base plate 37 having a glass door generally indicated at 38 which is semi-cylindrical in cross section and which forms one half of the shell previously designated at A. The base plate, door, and electrical components, as above noted, are in duplicate to form the cylindrical post type fixture, although the half sections alternatively may be installed individually as wall type fixtures, as described in detail at a later point in this specification. As shown in Figures 6 and 11, each door assembly 38 is hinged by means of pins 39 and 40 passing through the end plates 30 and 31, and since the respective half sections are duplicates, the pins are located at diametrically opposite sides when the mating base sections 37—37 are placed face to face. Each base plate 37 consists of an elongated sheet metal plate bent to form a channel 41 (Figure 6) having lateral extensions 42—42 along opposite sides. The outer edges of the extensions are bent outwardly at right angles to form the flanges 43—43 (Figure 10). In assembled condition, the lateral extensions are placed face to face with the channels 41—41 open to each other to cooperate mutually in forming the tunnel C which is substantially square in cross section.

The respective end plates 30 and 31 are semi-cylindrical so as to provide a circular closure at the upper and lower ends of the fixture when the base plates are placed in assembly. As illustrated in Figures 5 and 6, the inner edge of each end closure plate 30 and 31 is configurated to interfit the base plate, the edge which abuts the base plate being provided with a flange 44 which is spot welded to the base plate. The outer edge of each closure plate is provided with flanges 45 extending in the direction of the upper and lower closure caps 26 and 27, the edges of the caps being secured to the flanges by means of screws 46 which are threaded into the flanges, as shown in Figure 5.

Each transparent door assembly 38 consists of a metal frame 47 and a semi-cylindrical glass insert 48 mounted within the frame, as shown in Figures 9 to 11 inclusive. In order to diffuse the light rays, the inside surface of the shell preferably is frosted, while as above noted, the outside surface may be ribbed or corrugated. The frame 47 is fabricated from vertical members 49—49 and a lower transverse member 50, which members are right angular in cross section to retain the edges of the glass insert. The upper transverse frame member 51 consists of a flat strip to permit the insert to be slipped into the frame from the upper end with the frame permanently assembled, preferably by welding the members at their adjoining corners. As shown in Figure 11, the vertical edges of the glass insert are weathersealed to the frame by angular sealing gaskets 52 embracing the edge of the glass insert. The upper and lower edges of the glass insert are spaced from the door frame to provide ventilation and the edges are supported by means of U-shaped cushion blocks 53 embracing the edges of the insert and seated against the frame. This arrangement permits a flow of air through the fixture to prevent overheating and to prevent the formation of steaming or frosting of the glass during cold weather. The edges of the door frame which abut the base plate also are provided with gasket strips 55 along the vertical edges of the door. The upper and lower ends of the door assembly are enclosed by means of sealing bands which span across the opening between the closure caps and the ends of the doors, as described hereinafter.

As shown in Figures 11 and 12, the glass insert is maintained in the door frame by means of angle shaped retainer strips 54 which are welded to the vertical members of the frame 47. The hinge pins 39 and 40, previously noted, are welded respectively to the top and bottom frame members, as shown in Figure 11. To facilitate assembly, the upper pin 39 is considerably longer than the lower pin 40 to permit the upper pin to be slipped through its aperture whereby the door assembly may be elevated sufficiently to insert the lower pin in its aperture, there being provided for this purpose a clearance 56 between the door and top closure plate. This clearance is sufficient to permit the lower pin to be raised above the lower closure plate for insertion into its aperture and after insertion a cotter pin 57 is inserted through the lower pin 40 to lock it permanently in assembly.

As shown most clearly in Figures 3 and 7, the upper portion of tunnel C is provided with an opening 61 having a door 62 which is supported by hinges 63 secured to the channel. The door is held in closed position by a screw 65 passing through the door flange 66 into a nut 67 which is welded to the inside of the channel. Upon the inside surface of this door there is mounted the transformers 33 and, if necessary, other electrical parts (not shown) which are used in conjunction with the fluorescent tubes. The transformers 33 are mounted upon the door by screws 68 with the transformers normally residing within the tunnel C. This arrangement thus utilizes the tunnel as a receptacle for the transformers while the doors permit the transformers and other parts to be swung to an exposed position for convenient service or replacement. It will be apparent that the glass door 38 and fluorescent tubes 34 directly in front of the transformer door 62 must first be removed to permit the door to be opened.

A centering device, indicated generally at 70 (Figures 4 and 8), is mounted within the tunnel immediately below the transformer door 62 for supporting the fixture assembly upon its post. The centering device consists of a triangular sheet metal centering plate or stud 71 having its base 72 welded as at 73 to a mounting plate 74 which is welded permanently within the tunnel in a transverse position. The centering plate 71 extends downwardly with its apex projecting into the upper end of the tubular post 21 so that it centers the fixture assembly automatically with respect to the post by virtue of the angularly related edges of the plate 71; also, by reason of its angularity, the plate will adapt itself to various diameters of posts automatically. In order to render the half sections interchangeable, each half section is provided with a mounting plate 74, but in practice the centering plate 71 is welded to one of the plates only, the plate being shown in Figure 4 as welded to the left hand plate. The assembled half sections, therefore, are completely interchangeable except that in furnishing half section assemblies for pole type fixtures, one of the sections is provided with the attached centering plate while the plate is omitted in the other.

In conjunction with the intermediate centering device 70, the lower ends of the respective body half sections are provided with cooperating alignment screws 75 by means of which the assembled fixture is aligned axially with the post 21 and clamped firmly in adjusted position. As shown in Figure 9, the screws 75 are threaded through complementary brackets 76—76, one for each half section, which are preferably welded to the lower edges of the respective channels 41. Each bracket is U-shaped, as viewed in Figure 9, corresponding to the contour of the channel and each is provided with laterally extended limbs 77—77 conforming to the flat portions 42 of the body half sections. The brackets are formed from metal having sufficient thickness to provide several screw threads for the screws 75 which pass diametrically through the corners of the brackets and upon assembly, the brackets 76—76 are secured together by bolts 78 passing through the limbs 77. After the two half sections are bolted together, the centering device 70 centers and supports the fixture upon its post and the screws 75 are then regulated individually to align the fixture longitudinally with the post 21 and then tightened to clamp it permanently in adjusted position.

Each assembled half section is a complete unit including the necessary electrical components and wiring so that, as furnished to the user, the section is ready for use upon being connected to a suitable source of power and bolted together. The electrical components are protected against overloads by plug type fuses 79 (Figures 4, 5 and 14) inserted in sockets 80 mounted in the top plate 30 of each half section; thus, necessary fuse replacements may be made very conveniently by removing the top cap 26.

*Installation procedure*

The pole type fixture is arranged to be installed by the average station operator with the use of very ordinary tools, simply by placing the mating half sections upon a post which is equipped with suitable electrical wiring. Described in connection with Figure 2, the first step in the installation is to place the pedestal 24 and bottom cap 27 upon the post 21 so that after installation of the fixture, the cap may be placed upon its lower end, as shown. If the pedestal 24 is to be omitted, a cap having a hole to fit the post itself is provided, in which case, this cap is placed upon the post and later slipped upon the lower end of the fixture. The next step is to place upon the post the fixture section which is equipped with the triangular centering plate 71, the plate being inserted in the upper end of the post to hold the section in position. The power lines which extend from the upper end of the post are now passed through the triangular holes 81 (Figure 8) which are formed by cutting the corners of the mounting plates 74. From the holes 81, the wires are passed through the spaces 82 (Figure 7) at the sides of the ballasts and passed upwardly to the top of the fixture to be connected to the terminals (not shown). By proceeding with the installation in this fashion, the electrical work and the mechanical assembly of the sections is simplified. After wiring the mounted section, its mating section is placed in position with the adjustment screws 75 loosened; next, a pair of bolts 83—83 (Figures 3 and 6) are passed through matching apertures in the flanges 42 at the top of the fixture, and the previously noted bolts 78 are installed through the matching bracket limbs 77 at the bottom. After these screws are tightened to hold the two sections firmly together the bottom set screws 75 are adjusted to center and align the lower end of the fixture and clamp it firmly to the post.

With the basic components of the fixture installed upon its post, the final assembly is completed by applying trim strips to the meeting edges of the half sections, applying the top and bottom caps 26 and 27, and installing sealing bands to weather-proof the fixture. For this purpose, longitudinal trim strips 85, as detailed in Figure 10, are placed over the meeting edges of the body half sections to conceal them and provide an ornamental appearance. These strips are formed from thin flexible sheet metal suitably plated and polished, the strip being doubled upon itself to provide yieldable limbs 86—86 adapted to be slipped upon the angular flanges 43—43 extending from the edges of the body half sections, as previously described. The strips are installed by slipping them telescopically over the flanges 43 and because of springiness inherent in the strips, they frictionally engage the flanges upon which they are placed.

As previously described, the door assemblies are weather proofed along their longitudinal edges with respect to the base plates 42—42 by the gasket strips 55. The upper and lower ends of the door are weather proofed by applying respective upper and lower bands 88 and 90 (Figures 4 and 5) which completely encircle the fixture, overlying the end caps 26 and 27 and the adjoining ends of the doors. Described in connection with Figure 5, the bands 88 and 90 are in duplicate, each consisting of a thin flat band of flexible sheet metal having angular flanges 91 and 92 bent inwardly along its opposite edges. Each band is provided with a weather proof gasket 93 formed from foam rubber or the like, which is cemented to the band and adapted to establish a seal between the cap and band, as shown in Figure 5. Respective gaskets 94 are cemented to the upper and lower edges of the door (Figure 3) to complete the seal. The band 90 for the lower edge of the door establishes a seal directly between the glass insert and cap and the band 88 for the upper edge of the door establishes a seal between the top cap and the flat frame member 51 of the door frame.

The bands overlie the upper and lower ends of the trim strips 85 and completely encircle the fixture and clamp the doors securely in closed position. For installation purposes, the bands are discontinuous, that is, they are interrupted as at 95 and the interrupted ends are drawn together by a latch indicated at 96 which constitutes a catch 97 secured to the band at one side of the gap and a clamp 98 at the opposite side of the gap. The latch preferably is a conventional structure of the type used as a pull-down device for trunk lids; thus, the latch includes a toggle lever 100 having a hasp or loop 101 engageable with the catch 97. Upon depressing the toggle lever, the loop is retracted to draw the ends of the bands toward each other and forcibly compress the sealing gaskets.

When it is necessary to open the doors for cleaning or replacement or servicing of parts, the bands 88 and 90 are removed by releasing the above described latches and slipping the bands out of engagement with the doors. Since there is danger of electrical sparking and shocks should the unit be serviced while electric current is applied to it, there is provided a safety switch which automatically deenergizes the electric circuit when either door is swung to an open position. As illustrated in Figure 5, the safety switch indicated at 102 is mounted by clamping nuts 103—103 to an angle bracket 104 secured to the top end plate 30. The safety switch 102 is a sensitive commercial unit, preferably a normally closed micro-switch having an actuating stem 105 which contacts the top door frame member 51 so that the stem 105 is depressed to close the switch when the door is closed and opens the switch when the door is opened. The switch is inserted in the main power lines so that the entire electric system is deenergized when the door is opened and serves not only to prevent ignition of gasoline fumes by preventing electric sparks with the doors open, but also safeguards the operator against accidental injury by failure to shut off the current prior to servicing the fixture.

*Wall installation of the fixture*

Figure 13:
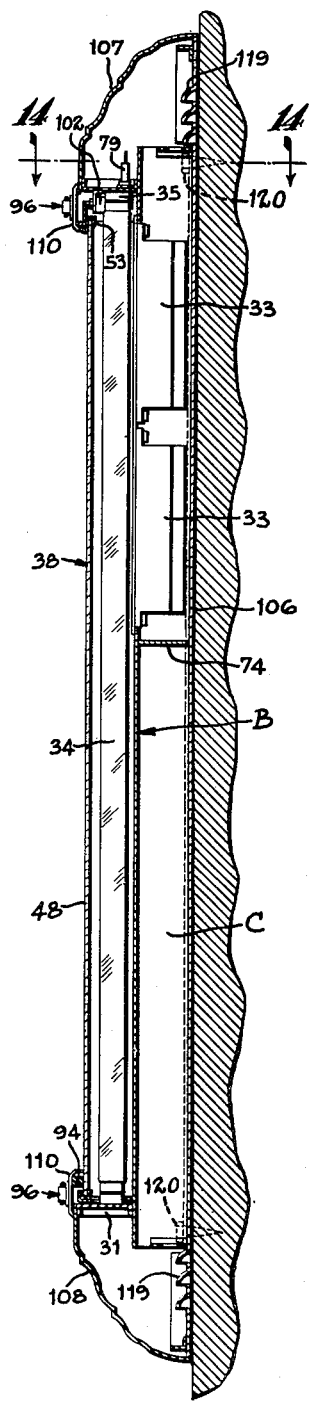
Figure 13 is a longitudinal sectional view of one of the half sections installed as a wall type lighting fixture.
Figure 14:
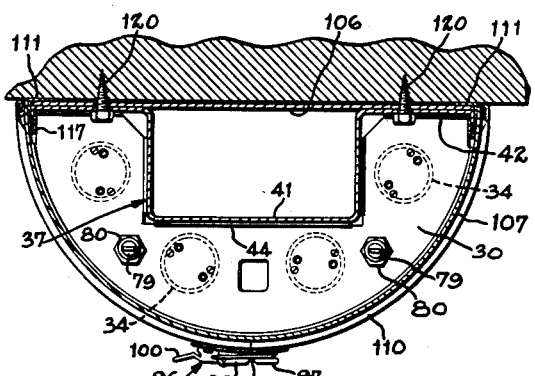
Figure 14 is a cross sectional view taken on line 14—14, Figure 13, further illustrating the construction and mounting of the wall type fixture.
Figure 15:
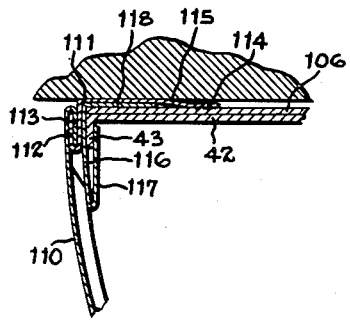
Figure 15 is an enlarged fragmentary sectional view detailing the anchorage arrangement for the sealing bands at the upper and lower ends of the wall fixture.

The fixture section may be installed upon a wall surface either in a vertical or horizontal position. The section is utilized without substantial change, except that an adaptor plate 106 is placed upon the back of the base plate and modified top and bottom caps 107 and 108 are utilized in conjunction with modified sealing bands 110. As shown in Figures 13 to 15, the adaptor plate corresponds in width to the base plate and its opposite marginal edges are provided with band anchoring strips 111—111 which are provided with a reverse bend 112 extending at right angles from the edge of the plate to cooperate with a reverse bend or hook 113 formed at the ends of the sealing bands 110—110. The inner end of the anchorage strip 111 is welded, as at 114, to the inner face of the adaptor plate 106 and the shank of the anchorage strip is offset slightly, as at 115, to provide space for the reception of a trim strip 116 which is inserted behind the anchorage plate with its outer edge doubled upon itself, as at 117, to embrace the flange 43 of the body member. The trim strip 116 is substantially the same as trim strip 85, previously described, except that it is of angular shape in cross section to provide a flange 118 engageable with the edges of the adaptor plate 106. The sealing bands 110—110 and door assembly are provided with the weather proof gaskets, previously described, and the bands are arranged to clamp the door in closed position by means of latch 96, as previously described. It will be noted that the upper and lower ends of the adaptor plate 106 extend beyond the fixture body into engagement with the top and bottom caps. If desired, the adaptor plate may be provided with louvres 119 for ventilating purposes.

The electrical supply for the wall type fixture is substantially the same as previously described; the wires may be introduced either through the wall into the fixture for concealment or they may be extended by means of a conduit through the cap either at the top or bottom. The fixture is furnished to the user completely assembled and ready for use except for the installation of the caps, sealing bands, and trim strips, as in the case of the pole type units. It is installed by applying lag screws 120 through the base and adaptor plate, as shown in Figures 13 and 14, through the same holes occupied by the previously described bolts 78 and 83. Prior to mounting the fixture permanently, the trim strips 116 are placed in position and the sealing bands are hooked upon their anchorage strips. The lag screws are then tightened to mount the unit permanently upon its mounting surface. Preferably, the unit is tested electrically before the end caps 107 and 108 are installed and for this purpose the bands 110 are clamped against the doors to complete the circuit through the safety switch. After testing, bands are loosened and the top and bottom caps are installed and screwed to the end plates. The sealing bands are then clamped in place to weather seal the unit and clamp the door in closed position.

*Floodlight mounting structure*

Figures 16, 17:
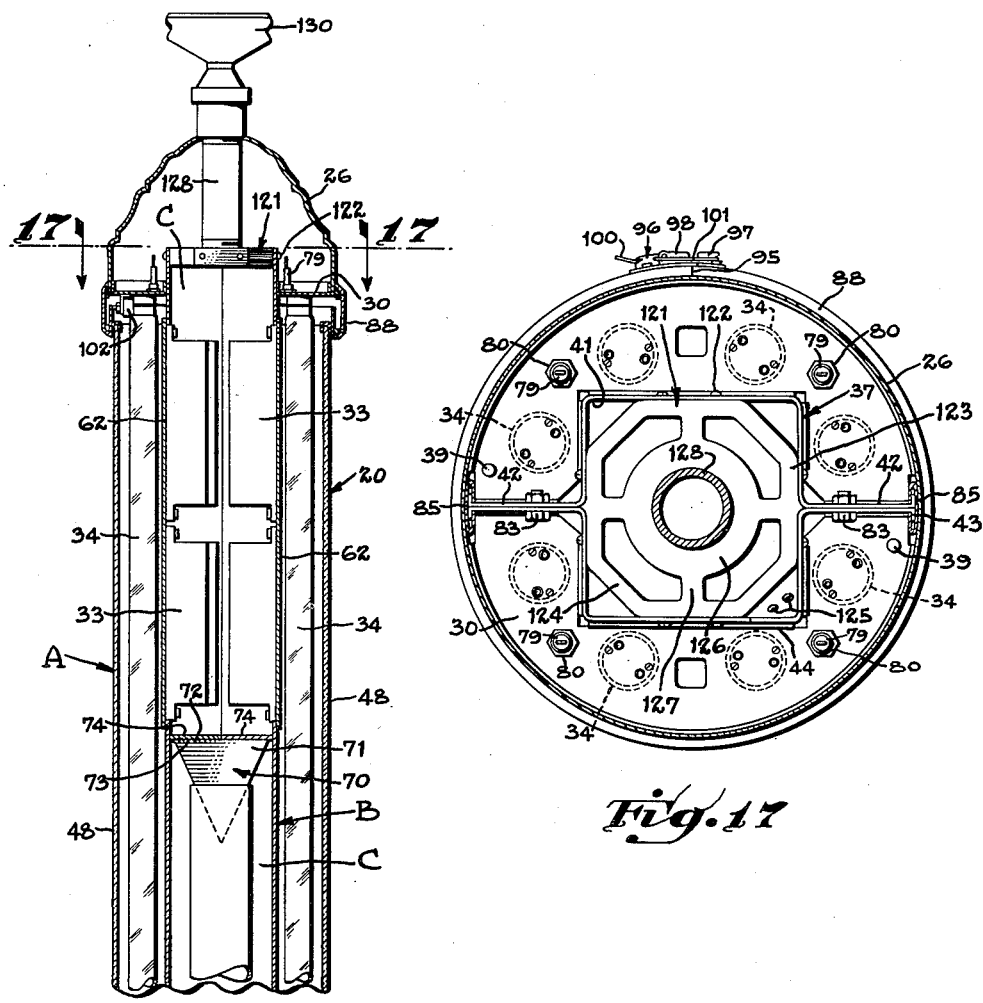
Figure 16 is a fragmentary sectional view similar to Figure 4, illustrating the fixture equipped with a bracket for mounting flood lights upon the top of the fixture.
Figure 17 is a sectional view taken on line 17—17 of Figure 16, further detailing the bracket arrangement.

Additional illumination may be supplied by mounting floodlights upon the top of the pole type fixture in the manner shown in Figures 16 and 17. For this purpose, a mounting plate 121 is secured by screws 122 to the upper end of the tunnel C. The mounting plate consists of a casting or forging having a frame 123 adapted to fit snugly within the tunnel and having diagonal corner sections 124 arranged to form openings for the wires 125 which pass from the tunnel to the floodlights. The plate includes a central hub 126 joined to the frame by connecting sections 127, the hub having a threaded bore to receive the end of a pipe 128.

Pipe 128 forms a part of a conventional floodlight assembly including a bracket 130 secured to its upper end for mounting a plurality of lamps (not shown). As shown, the cap 26 in this instance is provided with a central opening for the pipe 128. By this arrangement, the fixture may be equipped with the additional lamps by substituting a top cap 26 having the necessary opening and installing the mounting plate 121 in the tunnel.

Having described my invention, I claim:

1. A lighting fixture adapted to be mounted on top of an upstanding and generally vertically disposed tubular mounting post, said lighting fixture comprising a frame having a relatively long narrow shank with a centrally disposed recess within the shank, said recess open at its lower end for enclosing a portion of the top of the tubular mounting post, a cluster of luminescent gas glow tubes mounted on the frame in parallelism with one another about the shank portion thereof, a translucent housing supported by the frame and disposed about the cluster of luminescent tubes, a relatively flat downwardly tapering stud projecting downwardly from the frame into said recess at a level spaced above the lower extent of the recess, said stud adapted to enter the top of the tubular mounting post partially, to a degree depending upon the diameter of the inside of the mounting post, to transpose the weight of the frame thereto, and means carried by the frame below the tapering stud for engaging the mounting post to adjustably tilt the tapering stud and frame on the mounting post to secure the cluster of parallel luminescent tubes in true vertical position.

2. A lighting fixture adapted to be mounted on top of an upstanding and generally vertically disposed tubular mounting post, said lighting fixture comprising a frame having a relatively long narrow shank with a centrally disposed recess within the shank, said recess open at its lower end for enclosing a portion of the top of the tubular mounting post, circular flanges secured to and surrounding the upper and lower ends of said shank substantially at right angles thereto, a cluster of luminescent gas glow tubes having their respective opposite ends mounted on said circular flanges and extending in parallelism with one another about the shank portion of the frame, a pair of relatively long translucent doors surrounding the cluster of luminescent tubes, each door having an edge hingedly connected at opposite ends to the circular flanges, a relatively flat downwardly tapering stud projecting downwardly from the frame into said recess at a level spaced above the lower extent of the recess, said stud adapted to enter the top of the tubular mounting post partially, to a degree depending upon the diameter of the inside of the mounting post, to transpose the weight of the frame thereto, and radially disposed screws carried by the frame below the tapering stud for engaging the mounting post to adjustably tilt the tapering stud and frame on the mounting post to secure the cluster of parallel luminescent tubes in true vertical position.

3. A lighting fixture adapted to be mounted on top of an upstanding and generally vertically disposed tubular mounting post, said lighting fixture comprising a pair of complementary frame sections adapted to be mounted individually upon the top of the post, said sections adapted to mate in facial engagement and to provide in assembly a relatively long narrow shank with a centrally disposed recess within the shank, said recess open at its lower end for enclosing a portion of the top of the tubular mounting post, means for securing the complementary frame sections together in mated facial engagement, a cluster of luminescent gas glow tubes mounted on the frame in parallelism with one another about the shank portion thereof, a translucent housing supported by the frame and disposed about the cluster of luminescent tubes, a fixture support attached to the frame and located in the recess at a level spaced above the lower extent of the recess, said fixture support having tapered bearing surfaces for centering and aligning the fixture on the top of the mounting post, and means carried by the frame below the fixture support for engaging the mounting post to adjustably tilt the fixture support and frame on the mounting post to secure the cluster of parallel luminescent tubes in true vertical position on the mounting post.

4. A lighting fixture adapted to be mounted on top of an upstanding and generally vertically disposed tubular mounting post, said lighting fixture comprising a frame having a relatively long narrow shank with a centrally disposed recess within the shank, said recess open at its lower end for enclosing a portion of the top of the tubular mounting post, a cluster of luminescent gas glow tubes supported by the frame in parallelism with one another about the shank portion of the frame, a translucent housing supported by the frame and disposed about the cluster of luminescent tubes, a fixture support attached to the frame and located in the recess at a level spaced above the lower extent of the recess, said fixture support having tapered bearing surfaces for centering and aligning the fixture on the top of the mounting post, and means carried by the frame below the fixture support for engaging the mounting post to adjustably tilt the fixture support and frame on the mounting post to secure the cluster of parallel luminescent tubes in true vertical position.

HYMAN PHILLIPS.

REFERENCES CITED

The following references are of record in the file of this patent:

UNITED STATES PATENTS

| Number | Name | Date |
|---|---|---|
| 121,165 | Gouch | Nov. 21, 1871 |
| 2,418,926 | Francis | Apr. 15, 1947 |
| 2,422,857 | Shockette | June 24, 1947 |
| 2,490,191 | Baker | Dec. 6, 1949 |
| 2,511,440 | Long | June 13, 1950 |